April 7, 1959
R. FINGERHUT
2,881,239
GANG-TYPE CLOSURE FOR STORAGE BATTERIES
Filed June 5, 1956
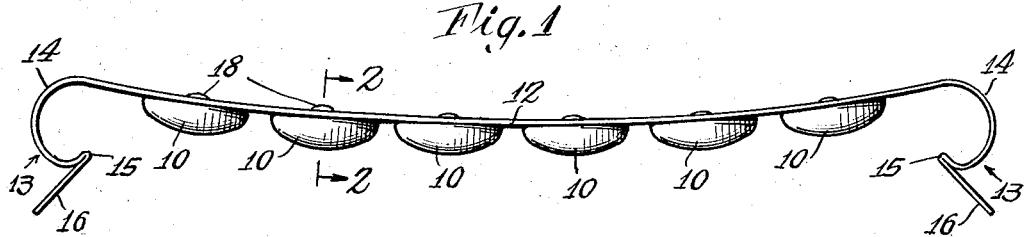
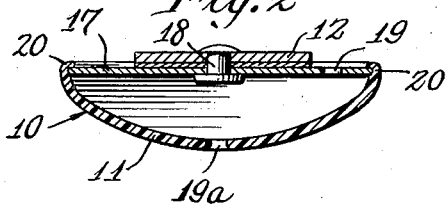
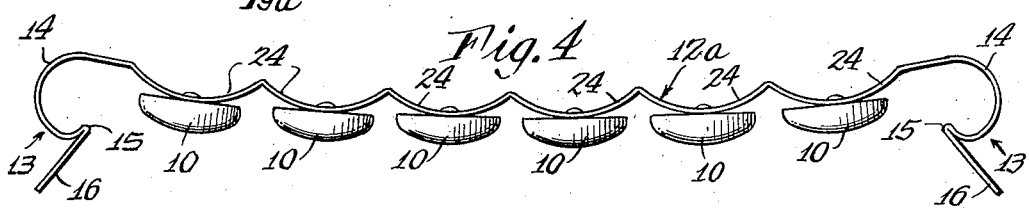
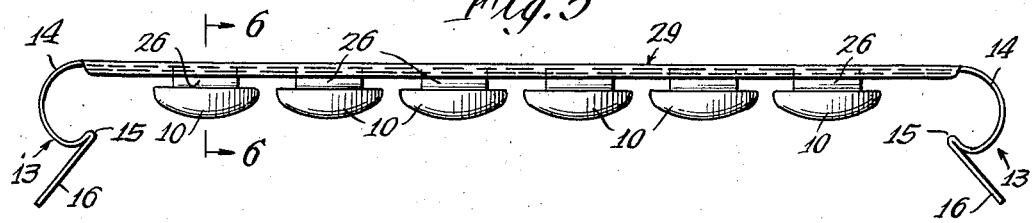
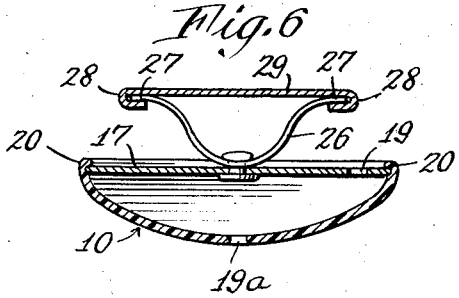
INVENTOR.
Rudolph Fingerhut
BY
Munn, Liddy, Nathanson & March
ATTORNEYS

United States Patent Office 2,881,239
Patented Apr. 7, 1959

2,881,239

GANG-TYPE CLOSURE FOR STORAGE BATTERIES

Rudolph Fingerhut, Brooklyn, N.Y., assignor of one-half to Jacques A. Davis, Inc., New York, N.Y.

Application June 5, 1956, Serial No. 589,412

3 Claims. (Cl. 136—170)

This invention relates to storage batteries of the type having filling openings for the electrolyte, and more particularly to unitary, multiple or ganged-closures for such batteries.

In the past a number of closure or cap devices have been proposed by which the plurality of filling and vent openings of a storage battery might be easily and quickly simultaneously opened or closed.

While these prior proposals and closures have appeared to be satisfactory, they were subject to a number of disadvantages and drawbacks when in use. For one thing, the prior proposed devices generally represented a somewhat complicated and expensive construction. Those which appeared to be of simpler and less expensive construction did not provide an adequate closure or seal of the battery cells, with the result that the acid from the battery crept out and caused damage to the battery case holder and adjacent parts of the equipment which the battery served. The action of such acid in eating away the metal parts generally necessitated complete replacement of the holder, involving not only the expense of new parts but also the employment of a serviceman or organization, with the ultimate result that the expense was quite appreciable.

The present invention obviates the above drawbacks and disadvantages of these prior gang-type closures, and one object of the invention is to provide a novel and improved, gang-type closure for storage batteries and the like, which is extremely efficient and effective in securely closing the openings of the battery and preventing acid or electrolyte from creeping out and damaging adjacent components or equipment.

Another object of the invention is to provide an improved, gang-type closure in accordance with the above, which is extremely simple in construction, involving relatively few components, and is inexpensive to fabricate and to assemble.

A feature of the invention resides in the provision of an improved, gang-type cap or closure for storage batteries as above set forth, which may be easily and quickly applied to existing batteries without requiring modification thereof.

Yet another object of the invention is to provide an improved, gang-type closure as above characterized, which may be easily and quickly actuated to provide access to the battery cells and to again shut off or close the cells, incident to filling and/or servicing of the battery.

Other features and advantages will hereinafter appear.

In the drawing accompanying this specification, similar characters of reference indicate corresponding parts wherever possible in the several views, in which:

Figure 1 is a side elevational view of an improved, gang-type closure device made in accordance with the invention.

Fig. 2 is a transverse sectional view taken on line 2—2 of Fig. 1.

Fig. 3 is a transverse sectional view similar to that of Fig. 2, but illustrating a modification of the invention.

Fig. 4 is a side elevational view of a gang-type closure device, illustrating another embodiment of the invention.

Fig. 5 is a side elevational view of a gang-type closure device illustrating yet another modification of the invention.

Fig. 6 is a transverse sectional view taken on line 6—6 of Fig. 5.

The improved battery cell closure device of the present invention, as illustrated in the embodiment thereof shown in Fig. 1 comprises a plurality of closure means or members 10 adapted to engage and seal against the mouths of the filling openings of juxtaposed storage battery cells. In the broader aspects of the invention the closure means 10 may be formed in any suitable manner to coact with the walls of the filling openings. However, it is preferred, in accordance with the invention, to make the closure members 10 of yieldable or resilient construction, as for example by forming said members in the shape of cups constituted of flexible plastic, rubber or rubber-like material of acid-resistant characteristic. As shown in Fig. 2, any of the closure elements 10 may comprise a shallow cup-like member 11, which may be of a neoprene or polyethylene or other acid-resistant formulation retaining substantial resiliency and flexibility after being molded. The bulbous lower exterior configuration of the cups 11 is such as to enable central portions of the cups to be disposed across the mouths of the filling openings of the battery in intimate pressurized contact with the lips thereof, so as to provide an efficient and effective seal, preventing egress of acid or electrolyte from the battery cell.

By the present invention I provide a novel, improved and greatly simplified means for resiliently or flexibly mounting the sealing means 10 as a unitary assemblage across the top of the storage battery in such a manner that said closure means are all held under sealing pressure against the individual filling openings. In Figs. 1 and 2 this resilient mounting comprises an elongate flexible bar 12 adapted to span the top of the battery, said bar having clamping or fastening means 13 at its extremities, in the form of curved integral portions 14 shaped like hooks and having bills 15 with outwardly-directed fingers or tabs 16. The bills 15 of the clamping means 13 are adapted to be received in either recesses in the opposite ends of the battery case or under shoulders existing on the battery holding means. The tabs or fingers 16 constitute camming surfaces by which the clamping means may be readily pressed in place, as will be readily understood, and further constitute manual operators by which the clamping means 13 may be forced outward and released, to enable the gang-type closure device to be separated and removed from the battery.

The elongate flexible member or bar 12 may be of strip stock formed of acid-resistant metal or plastic or non-resistant metal having an acid resistant coating or the like. As shown, the bar 12 is normally bowed downward at its center so that when not in use it presents an upper concave surface and a lower convex surface. Upon the closure device being applied to the battery, the bar 12 will be straightened and will hold under pressure the closure means 10 against the mouths of the filling openings, the walls of such closure means yielding slightly under the continuous pressure and thereby effecting a tight seal. As seen in Fig. 2, each closure means 10 may further comprise a mounting disk 17 secured to the bar 12 by a rivet 18 and having a vent opening 19. The cup 11 may have a vent opening 19a, and an inwardly-grooved annular rim portion 20 adapted to receive and snugly fit the mounting disk 17, thereby to constitute a complete assemblage.

I have found that a ganged battery cap as made in accordance with the above is inexpensive to fabricate and assemble, since it has relatively few components of simple construction. The gang-type closure is extremely effective in use through the resilient mounting of the closure means 10 as effected by the flexible bar 12, and additionally by virtue of the flexible or yielding construction of the closure means themselves. Moreover, the gang-type closure device may be very easily applied to the battery and removed therefrom quickly and without difficulty, obviating the necessity of unscrewing a plurality of individual screw caps as is necessary with the conventional type of storage battery.

A modified form of the invention is shown in Fig. 3, wherein there is illustrated a closure means 10a carried by a flattened loop-like member 22 adapted to encircle the elongate bar 12 and to be slidably adjustable therealong. With this construction there is had the added advantages that an adjustment of the closure means 10 along the bar 12 may be effected, to more accurately fit the closure means to the filling openings.

Another embodiment of the invention is shown in Fig. 4, wherein a plurality of closure means 10 is mounted on an elongate flexible bar 12a having in general a bowed configuration when not in use. By the invention, the bar 12a is provided with a plurality of short bowed sections 24 joined to each other end-to-end, there being one bowed section for each closure means 10. The closure means 10 are attached to the under or convex sides of the bowed sections 24, as illustrated, and in accordance with this form of the invention there is effected to a great extent an individual resilient mounting for the closure means 10.

Still another embodiment of the invention is shown in Figs. 5 and 6. In this embodiment the closure means 10 are carried by individual, reversely-curved leaf springs 26 having end portions or extremities 27 received in folded slide portions or tracks 28 of an elongate rigid bar 29. The springs 26, being yieldable, may be readily adjustably positioned along the bar 29 and provide an advantageous, individual resilient mounting for the closures 10 whereby sealing pressures are maintained which are independent of each other.

The extremities of the rigid bar 29 are provided with the clamping means 13 in the form of curved leaf spring sections 14, by which the bar may be readily attached to a storage battery to overlie the top surface thereof with the sealing means 10 in engagement with the filling openings of the battery.

It will be readily understood from the foregoing that I have provided a greatly simplified, novel and improved gang-type closure for storage batteries which is effective in its operation and simple to remove and apply, thereby greatly facilitating the servicing of the battery.

Variations and modifications may be made within the scope of the claims and portions of the improvements may be used without others.

I claim:

1. A gang-type closure for storage batteries comprising a plurality of individual stopper means adapted to close the filling openings of a battery, said stopper means being hollow, said stopper means being formed of a flexible acid resistant material and having a bulbous lower exterior configuration and an upper surface with said bulbous lower exterior configuration being spaced from said upper surface to define the hollow interior of said stopper means, and being flexible toward and away from said upper surface, a flexible elongate resilient bar bowed to define a concave upper side and a convex lower side, means connecting said stopper means to said bar in spaced relationship along the convex side of said bar with said upper surface facing said bar and said bulbous lower exterior depending outwardly below said convex lower side, said bar having attachment means at each of its ends by which the closure may be removably secured to the battery with each of said stopper means bulbous configurations being received in and closing one of the filling openings of the battery, said attachment means each comprising a clamp extending inwardly of said bar on the convex side of said bar.

2. The apparatus of claim 1 wherein said clamp comprises a curved hook-like member integrally connected with said bar and having a bill positioned beneath said bar on the inner extremity of the hook-like means.

3. The apparatus of claim 2 including tab means connected to each of said bills and extending outwardly therefrom with respect to the central portion of said bar and adapted to be grasped for manual deformation of the clamps and attachment of the closure means to a battery.

References Cited in the file of this patent
UNITED STATES PATENTS

| | | |
|---|---|---|
| 2,281,800 | Riedesel | May 5, 1942 |
| 2,570,123 | Heine | Oct. 2, 1951 |
| 2,629,760 | Wells et al. | Feb. 24, 1953 |